Oct. 29, 1968
C. E. HÖING
3,408,116
MEANS FOR CONVEYING A GRANULAR PRODUCT SUSPENDED IN A
GASEOUS CURRENT AND SEPARATING THE PRODUCT AT
THE END OF THE CONVEYING OPERATION
Filed Feb. 28, 1967
3 Sheets-Sheet 1
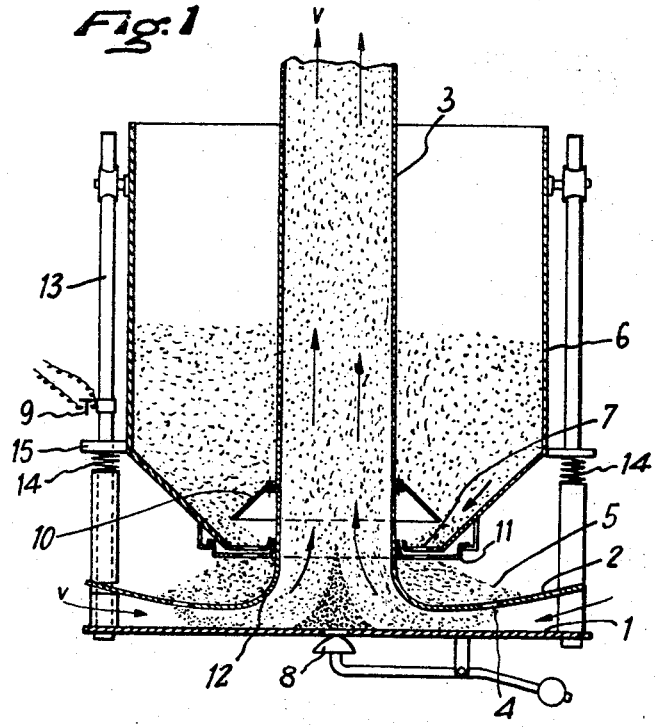
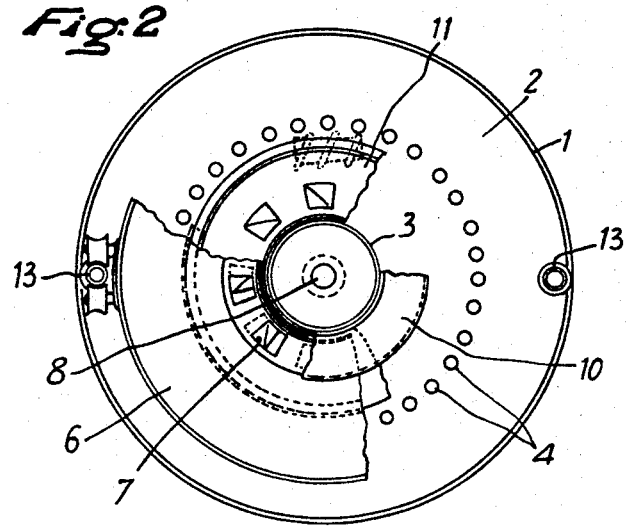
INVENTOR
CHRISTINE ELISABETH HÖING
By Young & Thompson
Attys.

Oct. 29, 1968  C. E. HÖING  3,408,116
MEANS FOR CONVEYING A GRANULAR PRODUCT SUSPENDED IN A
GASEOUS CURRENT AND SEPARATING THE PRODUCT AT
THE END OF THE CONVEYING OPERATION
Filed Feb. 28, 1967  3 Sheets-Sheet 2

INVENTOR
CHRISTINE ELISABETH HÖING
BY Young & Thompson
ATTYS.

Oct. 29, 1968    C. E. HÖING    3,408,116
MEANS FOR CONVEYING A GRANULAR PRODUCT SUSPENDED IN A
GASEOUS CURRENT AND SEPARATING THE PRODUCT AT
THE END OF THE CONVEYING OPERATION
Filed Feb. 28, 1967    3 Sheets-Sheet 3
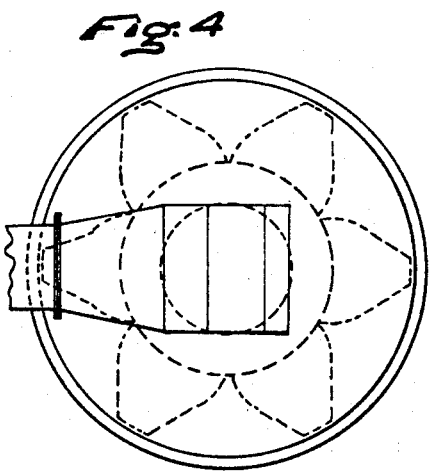
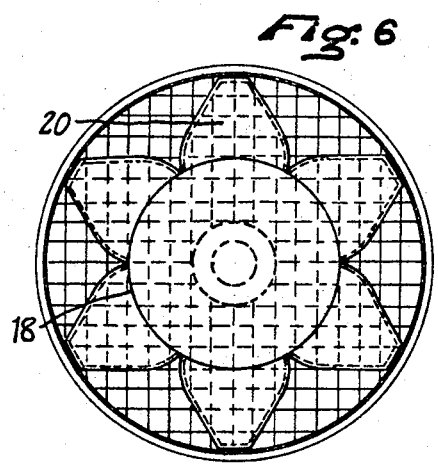
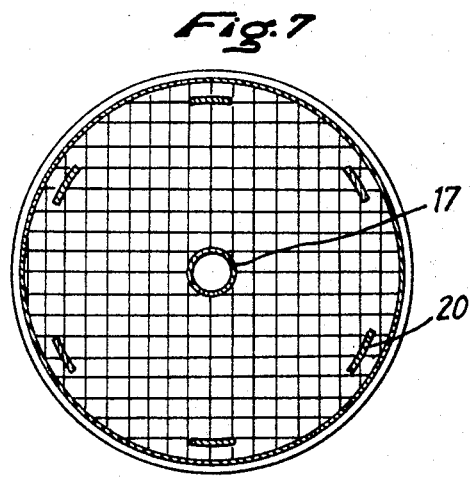
INVENTOR
CHRISTINE ELISABETH HÖING
BY Young + Thompson
ATTYS.

United States Patent Office 3,408,116
Patented Oct. 29, 1968

3,408,116
MEANS FOR CONVEYING A GRANULAR PRODUCT SUSPENDED IN A GASEOUS CURRENT AND SEPARATING THE PRODUCT AT THE END OF THE CONVEYING OPERATION
Christine Elisabeth Höing, Rue de Beaupreau 29, Sainte-Genevieve, Oise, France
Filed Feb. 28, 1967, Ser. No. 619,269
Claims priority, application France, Mar. 10, 1966, 52,813
5 Claims. (Cl. 302—52)

ABSTRACT OF THE DISCLOSURE

Apparatus consists of a pair of horizontal coaxial super-posed circular plates, the top plate of which converges towards the bottom plate in a direction towards the centre of the plates and opens into a tube extending vertically axially of the plates. The tube has upwardly divergent walls and is capped by a tore shaped downwardly directed member having a central bore in register with the upper part of the tube. Air is directed through the apparatus, the granular produce being injected into the air stream. When the granular product reaches the top of the tube it is separated from the air stream by the centrifuging action of the tore shaped member.

---

The present invention relates to a means for conveying a granular product suspended in a gaseous current and separating the product at the end of the conveying operation.

Products having a suitable granular structure, are often suspended in a gaseous current either for conveying purposes or for ensuring an exchange of heat between the product and a gas for drying or for a chemical treatment, for example. However, if it is necessary to provide a high speed gaseous current to maintain the granular product in suspension or if the mass of granular material forming the suspension is small in comparison with the weight of the gas, the power required may be uneconomic and may lead to the abandonment of the gaseous suspension method in spite of the advantages which it may otherwise provide.

It may also occur that the mass of gas required for conveying and holding the granular product in suspension, is larger than that necessary for ensuring a desired thermal or chemical operation.

Under conventional conditions of fluidization, the granular product is introduced into a gaseous current flowing at high speed. The granular product is introduced either axially through the air input port, or perpendicularly to the gaseous current through lateral ports, if necessary by mechanical means, such as a worm.

When the granular product is introduced in a direction perpendicular to the gaseous current, contact between the granules of the product and the molecules of the gas leads to a distribution of the original momentum of the gas molecules, the final speed of which must remain higher than the limit speed at which limit speed the larger granules of the granular product fall freely, the apparatus operating as a lifting means. This distribution leads, as is well known in the art, to a loss of energy in the gaseous current which is all the greater when the mass of the gaseous current is comparatively small and its initial speed is consequently high. This loss of energy results in difficulties of obtaining, in such a manner, mixtures with high granule content although such types of mixtures are essential if it is desired to obtain high outputs with apparatus of a reduced size.

The axial introduction of the granular product with the

2 air may seem more favourable, but its control is difficult and even impossible in the case where the gas inlet port lies inside a pile of granular material or is located at the foot of a collapsing bank of material. This leads sometimes to an almost complete closing of the port by the granular material with a considerable reduction in volume of the gas entering the apparatus and consequently in its speed, resulting in either a separation of the granular product at various points in its path; or the air entering too freely, leading to a lowering of the specific weight of the mixture to very reduced values. In order to obtain a certain uniformity in operation, bulky apparatuses are normally used which provide low specific weights associated with high fluid speeds and outputs and which consequently have a large energy consumption.

Of known methods of separating a granular product from a gaseous current with a view to recovering the product, centrifugation in one or more centrifuges is the method usually adopted. However, during centrifugation the gas reaches high speeds with turbulent effects which are detrimental to the efficient operation of such centrifugation plants and lead to a high expenditure of energy.

An object of my invention is to increase the efficiency of means conveying granular products in a gaseous current and increase the efficiency of means for suspending and separating granular particles, the properties of which are consistent with such conveying means, and possibly for treating the particles during the conveying operation of such conveying means.

A further object consists in providing safety means operating automatically in the case of a mishap during operation.

According to the present invention there is provided apparatus for conveying particles suspended in a gasiform stream, said apparatus comprising a convergent channel, constituted by two coaxial superposed plates in the shape of a solid of revolution of which the upper plate is in the shape of a convergent nozzle facing upwardly, direction means for directing the particles in the gasiform stream and forming an extension of said nozzle, gas conveying means for conveying the gasiform stream through said direction means, introducing means in the upper plate of the channel for introducing the particles distributed over said upper plate, and separation means for separating the particles at the output end of the particle conveying tube.

My invention is applicable to dry and pulverulent or crushed ore, to crystalline chemical products, to vegetable grains and the like without this listing being exclusive so that, generally speaking, it is applicable to any granular material having compartively small granular particles, having only a small tendency to agglomeration and producing preferably, when heaped, a bank of a well defined slope. These last features are favourable without being essential: their absence may imply certain precautions and certain auxiliary arrangements.

My invention is derived from an examination of the conditions governing the conveyance of graular particles by a fluid with a view to obtaining a substantially homogeneous mixture, as also of the conditions of separation, and loss of energy during the conveyance of the particles and separation of the particles together with means adapted to reduce such energy losses.

In particular, my investigation has shown that, by mixing granular particles and a gas inside a convergent channel, transformation into kinetic energy of the work produced by the pressure of the gases is obtained with an excellent yield, even if the general direction of flow inside the convergent channel is finally changed and, in particular, upwardly directed so as to produce an upward flow for lifting apparatus. There is no objectionable tendency to separation inside a convergent channel and specific weights of the mixture, which are very high and rise several times above that of the conveying gas may be easily carried so that it is possible to obtain very large yields with apparatus of a moderate volume and power. An auxiliary advantage is that the speed of the fluid required for conveying the larger particles in the upwardly directed parts of their path may be reduced. These large particles have a high limit speed at which they fall, but in a mixture which is highly loaded with granular material, such heavy particles are carried along by the impact of smaller particles the limit speed of fall of which is smaller and consequently the resultant speed is larger. Lastly, provided the kinetic energy of the mixture is sufficiently recovered before separation, high speeds of flow are not inconsistent with moderate losses. There is even a well-defined advantage in that the granular particles have a high absolute speed, chiefly in the upwardly directed portions of their path in which they drop out of the conveying fluid at a relative speed which approximates the limit speed of fall, and in the horizontal portions of the path where the speed opposes the deposit of granular material over the lower part of the pipe-line and any reduction which would be produced by such a deposit. The advantage of using smaller cross-sections may thus also be added to the advantage as to reduction in energy consumption.

In my invention, I propose to solve the problem of conveying the granular particles in the following manner:

(a) The particles are introduced throughout the cross-section of the gaseous stream at least at a number of points on said cross-section sufficient for uniformity in distribution to be obtained after a very short travel.

(b) The input points are located at the input end of convergent channel in an area where the speed of the gas is not initially high and the difference between said speed and that of the particles rises only very little above the minimum essential for the conveyance of the particles by the gas. Said minimum value depends on the average direction of the gaseous stream with reference to a vertical line. It is very reduced in the case of a downwardly directed flow.

(c) The mixture which behaves thenafter somewhat in the manner of a heavy homogeneous fluid is gradually accelerated inside the convergent channel up to the value required for driving the large particles throughout the different sections of its path.

Separation between the granular particles and the gas is obtained by sufficiently reducing the average speed of the mixture, preferably by increasing the cross-sectional area of the passage and then by generally downwardly directing said mixture so as to collect the granular particles from the gasiform stream.

The granular particles are fed into a hopper provided at its lower end with holes of an adjustable width in the upper plate of the convergent channel. If it is desired, in addition to its feeding granular particles, to make said hopper play a part in automatically cutting out operation of the arrangement in the case of a stopping of the feed of granular particles, said hopper is mounted so as to slide freely over the vertical suction tube along which it is guided by vertical uprights. It is carried by means of springs so that it may rise in the case of a stoppage of the feed and stop automatically the input of the granular product, for instance by means of a collar secured to the vertical suction tube. The rising of the hopper may also stop automatically the operation of the means driving the conveying gas.

The lower plate of the convergent channel may be provided, in registry with the axis of the vertical tube, with a port provided with a closing member opening automatically in the case of an interruption in the gaseous current.

The arrangement disclosed may be adapted without any modification of the chief components for removing the granular product which may have accumulated in considerable depth, for instance at the lower end of a silo, while ensuring the free flow of air into the convergent channel, by means of a stationary or movable pipe.

The separating means includes a vertical tube terminating in a divergent channel entering the hopper. In said hopper there is provided, above the tube, a tore-shaped surface having a vertical axis and provided with deflecting arms. The upper end of the hopper has a broad opening for the exhaust of the gases and its lower end has a port for exhaust of the granular product, said port opening preferably into a sluice or the like arrangement to allow exhaust under atmospheric pressure.

An embodiment of a method and means for conveying a granular product suspended in a gaseous current and for separating the product at the end of the conveying operation will now be described by way of example with reference to the accompanying drawings. Dry sand or ore the granular structure of which is comparatively uniform and ranges between say 0.1 and 0.4 mm. is removed from the lower part of the hopper and is conveyed up to another hopper located at the top of a building through a substantially vertical pipe. The difference in level is irrelevant and has as a matter of fact only a limited action on the conditions governing the conveyance and the separation of the granular particles, as also on the power required for obtaining a predetermined throughput of granular material. The driving means controlling the flow of gases comprises an aspirator located on the downstream side of the separating means.

In the drawings:

FIGURE 1 is a vertical cross-sectional view of the arrangement for conveying the solid particles in the gaseous stream.

FIGURE 2 is a plan view with parts broken away of the arrangement shown in FIGURE 1.

FIGURE 4 is a plan view of the separation means shown in FIGURE 3.

FIGURES 6 and 7 are cross-sections through lines VI—VI and VII—VII respectively of FIGURE 5.

Figure 3:
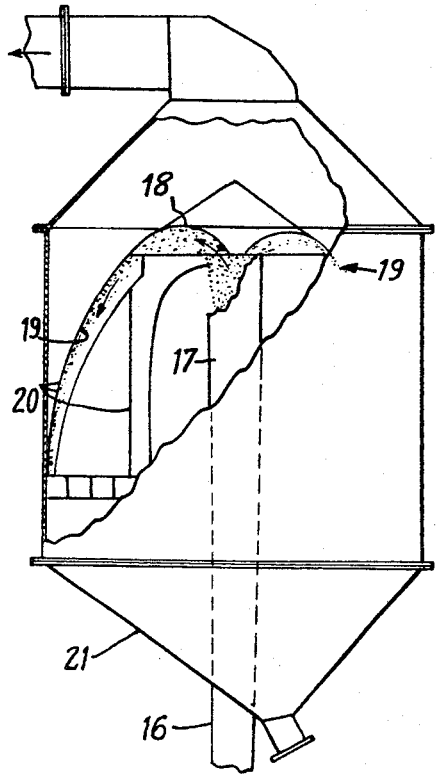
FIGURE 3 is a side elevation with parts broken away of the separation means for separating the granular particles from the gas conveying them.

The convergent channel shown in FIGURE 1 is constituted by the space separating two coaxial annular circular plates; the lower plate 1 is flat and horizontal and the upper plate 2 has an upwardly directed concavity. In said convergent channel the flow is directed radially and inwardly along a first almost horizontal line and rises then toward the axis so as to enter the vertical suction tube 3 connected coaxially with the upper plate 2 through a collar 12.

The upper plate 2 is furthermore provided with one or more annular series of perforations 4 which connect the space between the two plates with the bottom of the annular sloping heap 5 passing out of the annular hopper 6. When the hopper is fed under normal conditions, the sloping head, formed by the granular product which passes out of the bottom of the hopper through an annular slot adapted to be closed or through an annular series of juxtaposed ports 7, covers the annular series of perforations 4. The product drops into the convergent channel, its dropping being furthered by the reduction in pressure inside the convergent channel, the greater portion of the reduced pressure area being in the region of the annular series of perforations and also by the air filtering through the reduced thickness of granular material at the foot of the sloping heap. For values of the diameter and spacing of the plates suitably selected as functions of the diameter of the tube 3, of the diameter of the annular series of perforations 4 and of the size of said perforations, each perforation in the annular series of perforations 4, produces a jet of granular particles between the plates 1 and 2. The efficiency of the jets depends upon a sufficient covering of the annular series of perforations by the sloping heap of which the extent depends on the location of the output ports of the hopper, with reference to the plate 2 and to the annular series of perforations 4, and for a suitable value of the reduction in pressure at the foot of the vertical tube.

This reduction in pressure depends upon the pressure supplied by the aspirator minus the losses of head of all kinds in the tube 3 and in the means separating the granular products which are inserted between the tube and the aspirator. Thus each perforation of the annular series of perforations 4 produces a jet of the granular product extending originally in a vertical downward direction after which the granular particles follow immediately thereupon a curve until they enter a horizontal and inwardly radial path. The interengagement of the jets passing out of all the perforations in the annular series 4 forms a substantially homogeneous flow between the plates, which moves into a column engaging and rising inside the tube 3. By reason of the convergence of the stream and of its gradually increasing speed, there is no separation of the granular product except in the vicinity of the center of the lower plate 1 where it is possible to find a small conical heap of an unvarying volume within an area which is substantially devoid of flow. Thus losses are reduced and the specific weight of the mixture may be brought to a high constant value and maintained at such a value.

The high specific weights of the mixtures obtained in the manner disclosed do not act unfavourably on the movement over a substantial difference in level. However, for a given level the pressure difference is higher than for materials having low specific weights which may in fact be increased by an increase in viscosity. The aspirator must therefore match such differences in level, which leads to no difficulty in most cases. But, in the case of a mishap leading to a stoppage or to a slowing down of said apparatus, the granular product separates out and forms a comparatively thick plug at the foot of any vertical pipe section or of any pipe element showing a steep slope. It is consequently sometimes impossible to make the plant start afresh without immediately removing the plugs thus formed through suitably located ports which are closed again after removal of the material forming the plugs. The feed should also be cut off as provided generally by automatic means and operation is resumed possibly after a delay until the flow of the driving fluid is restored.

FIGURE 1 shows examples of automatic arrangements provided according to the invention.

A port 8 associated with a closing member is held in a closed position by the suction exerted thereon by the drop in pressure and it opens in the case of a stoppage of the aspirator so as to allow the solid material which has collected at the lower end of the tube 3 and which would prevent the arrangement from starting again to drop out.

The hopper 6 is adapted to slide vertically on the uprights 13 and is resiliently supported on springs 14 such that as soon as the feed of granular material into the hopper stops the hopper 6 rises along the uprights 13. The base of the hopper then engages with the collar 10 rigid with the suction tube 3 so as to produce a stoppage of the feed of granular material from the hopper into the convergent channel 1, 2. Furthermore, the rising of the hopper 6 operates the switch 9 controlling the aspirator through a projection on the hopper, whereby the flow of gas is stopped.

A ferrule 11 adapted to adjust the amount of material feeding the sloping bank of heaped up material prevents build up of the bulk of said bank in the event of a stoppage and restores the normal conditions of operation after the re-starting of the aspirator, if required with a delay. Said arrangement, or any other equivalent arrangement adjusting, for instance, the vertical spacing between the ports, through which the ore or the like material drops and the plate 2, allows the aspirator the maximum benefit so that during operation the normal rotary speed should be reached before the mixture has entirely filled the apparatus under conditions of maximum specific weight.

Figure 5:
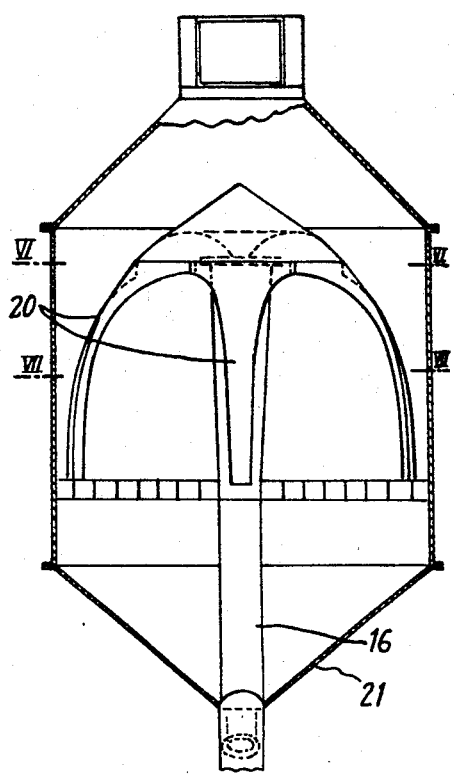
FIGURE 5 is a side cross-sectional view of the separation means shown in FIGURE 4.

In the case of a lifting apparatus selected by way of example (FIGURES 3 to 7) and including as a main element a vertical tube extending throughout the difference in level between the upstream hopper and a downstream hopper fitted in the upper part of a building, said vertical tube 16 forming an extension of the tube 3 of FIGURE 1 opens according to the invention and as illustrated in FIGURES 3 and 5 into a divergent channel 17 arranged axially of and underneath a surface 18. The surface 18 deflects the particle stream downwardly while slowing it down by a rapid increase of the cross-section afforded for its passage. The granular material which is centrifuged by this change in direction slides over said surface before leaving it as a thin layer 19. With a surface 18 in the shape of a tore there is obtained a stream 19 having a parabolic meridian line. In order to prevent said layer from allowing air to pass through it towards the aspirator, which might lead to disturbance of the flow of the granular material in spite of the low average value of the speed of said air, deflectors 20 associated with the tore-shaped surface 18 confine the flow of granular material so as to guide it as it drops into the receiving hopper 21.

Another solution consists in providing a surface receiving the mixture and constituted by an annular series of buckets. Each of said buckets urges the solid particles reaching it towards its axis so as to lead them into an exhaust tube. Such a separator is highly efficient in spite of its reduced bulk and is suitable for mixtures having a high specific weight and it may of course be associated with any other separator if required, for instance with filters or washing means adapted to stop very fine dust particles and which may be fitted ahead of or beyond the aspirator.

As described above, the vertical tube 16 which forms an extension of the tube 3 of FIGURE 1 terminates with a divergent channel 17. It is in fact of interest to slow down the mixture before any change in direction in contact with the tore-shaped surface 18 or with the annular series of buckets with a view to obtaining the maximum benefit of the kinetic energy of the granular particles instead of allowing said energy to be transformed into heat through impact and friction against such surfaces, which leads to considerable abrasion if the particles thus conveyed include hard particles. Simultaneously such a slowing down homogenizes the speeds which are higher for small grains than for large grains in the cylindrical section of the tube 16. A similar arrangement may be obtained by producing a stream of gases by an increase in pressure at the lower end of the lifting apparatus instead of a suction action at the upper end as in the example illustrated.

In such a case, said lower end should be located within a fluidtight chamber, subjected to an excess pressure. Feeding of granular products from the hopper is performed under free flow conditions as before, provided that a column of the granular product of a sufficient height is formed permanently inside the hopper so as to maintain fluidtightness in said chamber at the lower end of the apparatus or else that the product is introduced into the hopper through an air-lock.

Hereinafter are given by way of example the results obtained through application of the present invention relating to the vertical lifting of a product constituted by particles of various ores the size of which ranges from between 0.2 to 0.5 mm. and the specific weight of which ranges from between 2.6 to 4.6 in proportions providing an average specific weight equal to 3.3.

Throughput to be maintained: 3 metric tons per hour.
Height to which the product is to be raised: 5 meters.

The elevator includes chiefly a vertical tube of a diameter of 100 mm. opening at its upper end into a cylindrical separator of a capacity of 500 litres.

The lower end of the tube is connected with suction means as described while the convergent channel has a diameter of 260 mm. with an input opening of a diameter of 40 mm. and a throttled section of a diameter of 12 mm. The product fed from an annular feed hopper is admitted into the convergent channel through two annular series of perforations formed in the upper wall of the convergent channel and including each 14 perforations of a diameter of 8 mm.

The capacity formed by said operator is connected with an aspirator driven by a 1.5 H.P. motor.

When the operative circuit is open and no ore is being fed, the throughput of air in the rising tube is equal to 250 litres of air per second for a reduction in the input pressure by 150 mm. of a water column.

Under operative conditions and for a throughput of solid material equal to 3 tons per hour, the reduction in pressure inside the capacity formed by the separator is equal to 280 mm. of water, while the air throughput is equal to 170 litres per second. The power absorbed by the motor driving the aspirator is then slightly increased to 775 watts.

Modifications which are obvious for any one skilled in the art may be made to the apparatus which has been described and illustrated. In particular, the lower plate 1 may be curved instead of flat. The axis of the conveying tube 3 between the output of the convergent channel 1, 2 and its terminal point in the separating means (FIGURE 3) need not always be vertical.

I claim:

1. Apparatus for conveying solid particles suspended in a gasiform stream, comprising a pair of superposed plates, said superposed plates having central portions, the upper of said superposed plates having an outer portion that inclines upwardly outwardly from said central portion of said upper plate, said superposed plates converging toward their central portions, a conduit communicating with the space between said central portions of said plates, said plates defining between them a channel that is disposed about and converges toward the space between said central portions, means for forcing a gas through said channel toward said space and thence through said conduit, and means for feeding solid particles into said channel a substantial distance upstream of the most constricted portion of the channel with respect to the direction of gas flow through said channel toward said space.

2. Apparatus as claimed in claim 1, said superposed plates being circular and coaxial.

3. Apparatus as claimed in claim 1, said feeding means comprising a hopper that surrounds said conduit and that is disposed above said upper plate, said upper plate having openings therethrough for the passage of particles from said hopper to said channel, said openings being disposed a substantial distance upstream of said most constricted portion of the channel.

4. Apparatus as claimed in claim 3, and springs on which said hopper is mounted and by which said hopper is urged upwardly, and switch means for cutting off the operation of said gas-forcing means when the hopper is sufficiently empty to rise.

5. Apparatus as claimed in claim 3, and springs by which said hopper is carried and is urged upwardly, and a collar rigid with said conduit and extending outwardly within the hopper and contacting a portion of the hopper to close the hopper when the hopper rises under the influence of said springs.

References Cited

UNITED STATES PATENTS

| | | | |
|---|---|---|---|
| 782,260 | 2/1905 | Milne | 302—58 |
| 2,673,764 | 3/1954 | Cumming et al. | 302—53 |
| 2,916,761 | 12/1959 | Oberg | 302—58 |

ANDRES H. NIELSEN, *Primary Examiner.*